(12) United States Patent
Cao et al.

(10) Patent No.: US 12,015,286 B2
(45) Date of Patent: Jun. 18, 2024

(54) SYSTEM AND METHOD FOR CONTROLLING BATTERY CHARGER CABINET

(71) Applicant: NEUTRON HOLDINGS, INC., San Francisco, CA (US)

(72) Inventors: Nan Cao, San Francisco, CA (US); Hongtao Ma, San Francisco, CA (US); Meng Zheng, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 517 days.

(21) Appl. No.: 17/396,177

(22) Filed: Aug. 6, 2021

(65) Prior Publication Data
US 2023/0040972 A1  Feb. 9, 2023

(51) Int. Cl.
*H02J 7/00* (2006.01)
*B60L 53/30* (2019.01)
*B60L 53/62* (2019.01)
*B60L 53/80* (2019.01)

(52) U.S. Cl.
CPC .......... *H02J 7/00043* (2020.01); *B60L 53/30* (2019.02); *B60L 53/62* (2019.02); *B60L 53/80* (2019.02)

(58) Field of Classification Search
USPC .................................................. 320/106, 109
See application file for complete search history.

(56) References Cited

U.S. PATENT DOCUMENTS

| 8,560,147 B2 | 10/2013 | Taylor |
| 8,862,304 B2 | 10/2014 | Chen |
| 8,878,487 B2 | 11/2014 | Wu |

(Continued)

FOREIGN PATENT DOCUMENTS

| EP | 3342627 A1 | 7/2018 |
| WO | 2018104965 A1 | 6/2018 |

(Continued)

OTHER PUBLICATIONS

Extended Search Report for EP Appl. No. 22185282.5 dated Jan. 16, 2023, 8 pages.

(Continued)

*Primary Examiner* — Samuel Berhanu
(74) *Attorney, Agent, or Firm* — Dentons US LLP (57) ABSTRACT

The present application describes systems and methods for authenticating rechargeable batteries in a rechargeable battery cabinet. The rechargeable battery cabinet may be a part of a large, scalable, distributed network of rechargeable battery cabinets, in which rechargeable battery cabinets may be removed or added based on consumer demand for fresh batteries. The system and methods may track the rechargeable batteries and where they are located in the rechargeable battery cabinets by first assigning a dynamic identification number, such that a rechargeable battery compartment does not need a static identifier. The system and method may allow for real-time reading of the status of rechargeable battery cabinets and rechargeable batteries in the system. Each rechargeable battery may have a static identifier to uniquely identify the rechargeable battery. This system and method allows for efficient scaling and identification of rechargeable battery within the system.

20 Claims, 6 Drawing Sheets

(56) References Cited

U.S. PATENT DOCUMENTS

| | | |
|---|---|---|
| 8,996,212 B2 | 3/2015 | Chen |
| 9,124,085 B2 | 9/2015 | Wu |
| 9,129,461 B2 | 9/2015 | Luke |
| 9,176,680 B2 | 11/2015 | Chen |
| 9,182,244 B2 | 11/2015 | Luke |
| 9,275,505 B2 | 3/2016 | Taylor |
| 9,390,566 B2 | 7/2016 | Taylor |
| 9,407,024 B2 | 8/2016 | Wu |
| 9,424,697 B2 | 8/2016 | Wu |
| 9,552,682 B2 | 1/2017 | Luke |
| D789,883 S | 6/2017 | Luke |
| D806,019 S | 12/2017 | Wang |
| 9,854,438 B2* | 12/2017 | Luke .................. H02J 5/00 |
| 9,908,506 B2 | 3/2018 | Taylor |
| 9,911,252 B2 | 3/2018 | Wu |
| D820,782 S | 6/2018 | Wang |
| 10,040,359 B2 | 8/2018 | Chen |
| 2012/0274280 A1 | 11/2012 | Yip et al. |
| 2012/0322513 A1* | 12/2012 | Pattenden ......... H01M 10/4257 |
| | | 429/7 |
| 2014/0266006 A1 | 9/2014 | Luke |
| 2014/0277844 A1 | 9/2014 | Luke |
| 2014/0279576 A1 | 9/2014 | Luke |
| 2015/0185040 A1 | 7/2015 | Wu |
| 2017/0039631 A1 | 2/2017 | Luke |
| 2018/0182188 A1 | 6/2018 | Luke |
| 2021/0309121 A1* | 10/2021 | Jain .................. B60L 53/305 |

FOREIGN PATENT DOCUMENTS

| | | |
|---|---|---|
| WO | 2018153912 A1 | 8/2018 |
| WO | 2020261048 A1 | 12/2020 |
| WO | 2021035298 A1 | 3/2021 |

OTHER PUBLICATIONS

PCT International Search Report and Written Opinion in International Application PCT/US2020/012256, dated Apr. 17, 2020, 7 pages.

International Preliminary Report on Patentability in International Application PCT/US2020/012256, dated Jun. 16, 2021, 5 pages.

\* cited by examiner

SYSTEM AND METHOD FOR CONTROLLING BATTERY CHARGER CABINET

BACKGROUND

Ride share light electric vehicles (e.g., scooters, bicycles, mopeds, etc.) are becoming more common modes of transportation for short trips in urban environments. These electronic vehicles include batteries that need frequent charging, sometimes daily charging, or charging multiple times a day.

SUMMARY

Light electric vehicles (e.g., scooters, bicycles, etc.) are typically powered by a power source such as, for example, a rechargeable battery. In some examples, the rechargeable battery may be removably coupled to a light electric vehicle which enables an individual to exchange a rechargeable battery with little or no remaining power with another rechargeable battery (e.g., a rechargeable battery that has more power or is fully charged).

To exchange a rechargeable battery, the individual may be required to locate and travel to a rechargeable battery cabinet. When the individual arrives at the rechargeable battery cabinet, the individual may remove the rechargeable battery from the light electric vehicle, place the removed rechargeable battery in an available rechargeable battery slot in the rechargeable battery cabinet, select a new rechargeable battery, and secure the new rechargeable battery to the light electric vehicle.

In some examples, the rechargeable battery cabinet may require that the rechargeable battery undergo a check-in process prior to allowing the individual to take a different rechargeable battery. During the check-in process, the rechargeable battery cabinet may instruct the individual where to place the rechargeable battery and/or which rechargeable battery the individual should take. For example, the rechargeable battery cabinet may include an indicator, such as a lighting device, that illuminates which rechargeable battery slot will receive the rechargeable battery. The rechargeable battery cabinet may also indicate which rechargeable battery the individual should take (e.g., by illuminating the rechargeable battery slot associated with a battery that is fully charged or mostly fully charged).

The present disclosure also describes a method for exchanging rechargeable batteries at a rechargeable battery cabinet. According to some examples, the system may include a rechargeable battery cabinet for receiving rechargeable batteries, authenticating them, and charging them. The system of authentication may include assigning dynamic and static identification numbers to the batteries to ease the customizability and scaling of the system to add additional rechargeable battery cabinets and rechargeable battery receptacles in the cabinet(s).

In one example, the system includes a rechargeable battery cabinet that is configured to receive a rechargeable battery at a rechargeable battery receptacle. The system may include a connection switch of the rechargeable battery receptacle configured to transmit a connection signal to a controller, wherein the connection signal indicates that a battery is coupled with the rechargeable battery receptacle, in response to the processor receiving the connection signal, and generating a dynamic identification number corresponding to the rechargeable battery receptacle. The processor may also transmit the dynamic identification number to the rechargeable battery. The rechargeable battery can store the dynamic identification number. The processor can transmit a request to the rechargeable battery for a static identification number, and the request comprises the dynamic identification number. The processor can also read the static identification number from a memory of the rechargeable battery. In response, the rechargeable battery can transmit the static identification number to the processor, which, in turn, may transmit the static identification number to a server. The server may log the static identification number and the dynamic identification number of the rechargeable battery receptacle to which the rechargeable battery is attached. The server may also authenticate the static identification number and transmit an authentication message indicating that the static identification number is authenticated to the processor. In response to receiving the authentication message, the processor may enable a charger to deliver power to the rechargeable battery.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a rechargeable battery cabinet that houses and charges rechargeable batteries for electric vehicles (e.g., scooters, bicycles, and mopeds). The rechargeable battery cabinet includes an efficient and scalable means for authenticating and charging batteries in a large system of batteries and cabinets. This allows for efficient tracking of rechargeable batteries and adding or subtracting of rechargeable battery cabinets or cabinet portions without large overhead of reprogramming the system to specifically identify rechargeable battery receptacles.

An example of a way to accomplish this efficient and scalable system is to assign dynamic identifiers to the rechargeable battery receptacles when rechargeable batteries are inserted into them. The system may then use a dynamic identifier of a rechargeable battery receptacle to communicate with an rechargeable battery to receive a static identifier, unique to the rechargeable battery. The system may then log the dynamic and static identifiers to keep track of where a rechargeable battery is located in the system. The rechargeable battery cabinet that the rechargeable battery is connected to may then lock the rechargeable battery into place and begin charging it.

Figure 1:
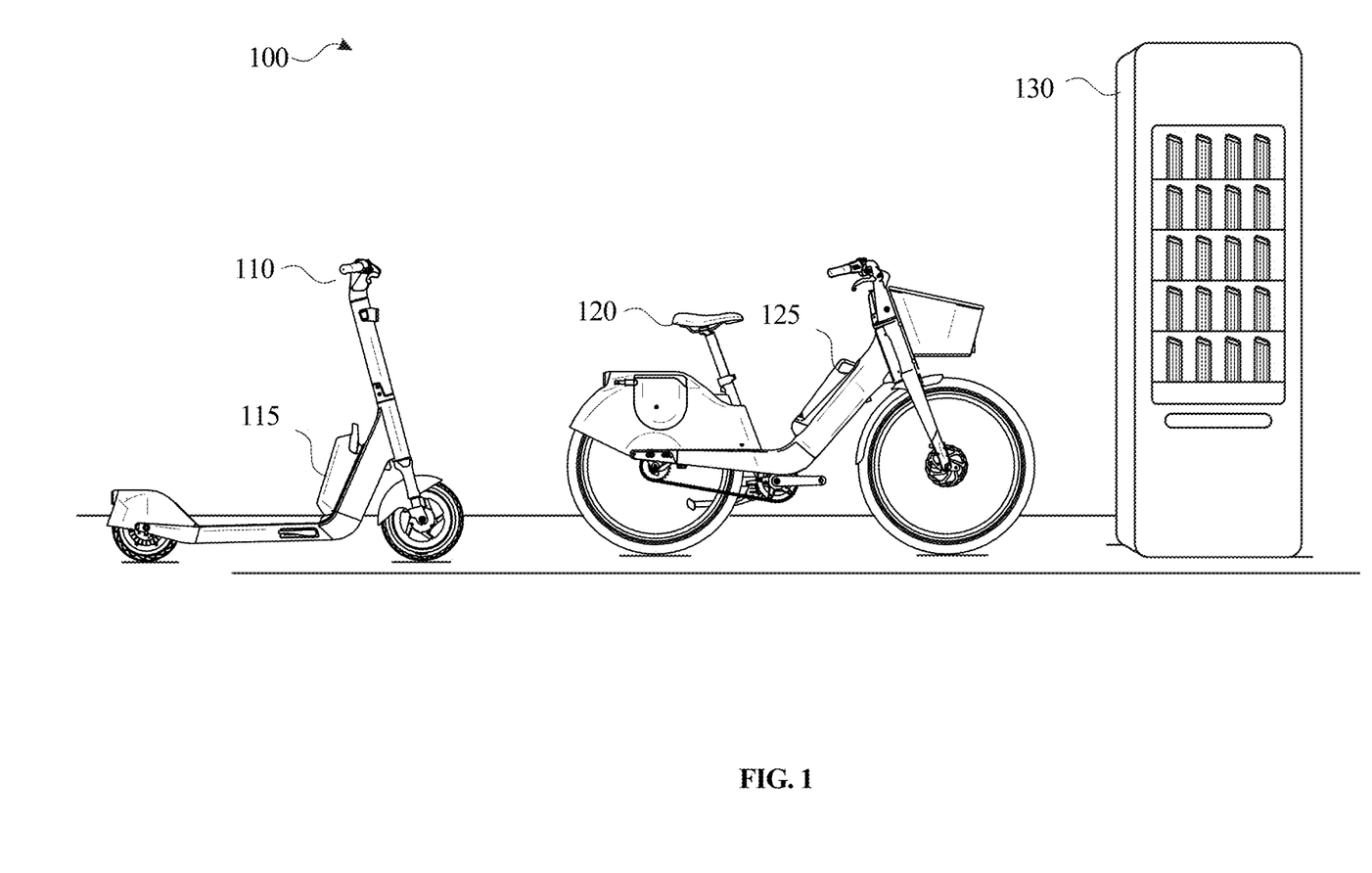
FIG. 1 illustrates different kinds of light electric vehicles according to one or more examples.

FIG. 1 illustrates an example environment 100 in which aspects of the present disclosure may be practiced. As illustrated, environment 100 includes at least one electric scooter 110, at least one electric bicycle 120, and a rechargeable battery cabinet 130. The electric scooter 110 and the electric bicycle 120 are examples of light electric vehicles and may contain rechargeable batteries 125 and 135, respectively. Aspects described herein apply to other types of light electric vehicles or larger vehicles.

The environment 100 may include a network service that receives information from the electric scooter 110 or the electric bicycle 120 (also referred to herein as light electric vehicles) over a network communication channel (e.g., one or more networks, the Internet, etc.). The information enables a user, using a client application executing on a computing device (e.g., a mobile application running on a mobile device), to locate, request, and/or reserve (e.g., rent or borrow for a duration of time) one or more light electric vehicles. The information may also enable a user to locate, request, and/or reserve a rechargeable battery for the light electric vehicles. In some examples, the rechargeable battery may be used across different light electric vehicles. For example, the same rechargeable battery may be used by the electric scooter 110 and the electric bicycle 120, or other light electric vehicles.

In some examples, the network service includes one or more computing systems or servers that are remote from the computing device of the user and the light electric vehicles. The one or more computing systems include an application programming interface (API) that enables the one or more computing systems to receive information from, send information to, and otherwise interact with the computing device, the light electric vehicles 110, 120 or the rechargeable battery cabinet 130. For example, a mobile device application may have interfaces to access information on a mobile device, such as using APIs to location from a location interface (e.g., GPS), accelerometer, data, to send and receive data via a network communication interface, or use other aspects of the mobile device.

For example, the client application executing on the computing device of the user receives, from the network service over the network communication channel, information about a location of one or more of the light electric vehicles. The location of each of the light electric vehicles may then be provided on a user interface of the client application. Additionally or alternatively, the location information about a location of one or more of the light electric vehicles may be communicated between a plurality of light electric vehicles and/or a plurality of client applications executing on one or more computing devices.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The system may also include the ability to direct the user to a rechargeable battery cabinet 130 using the client application. The client application may also direct the user to insert their discharged rechargeable battery into a specific slot or anywhere in the rechargeable battery cabinet. The client application may similarly instruct the user to select a specific rechargeable battery to insert into the light electric vehicle, or alternatively allow the user to select any rechargeable battery that has sufficient charge, as indicated, for example, by the client application or an indication on the rechargeable battery cabinet 130.

Figure 2:
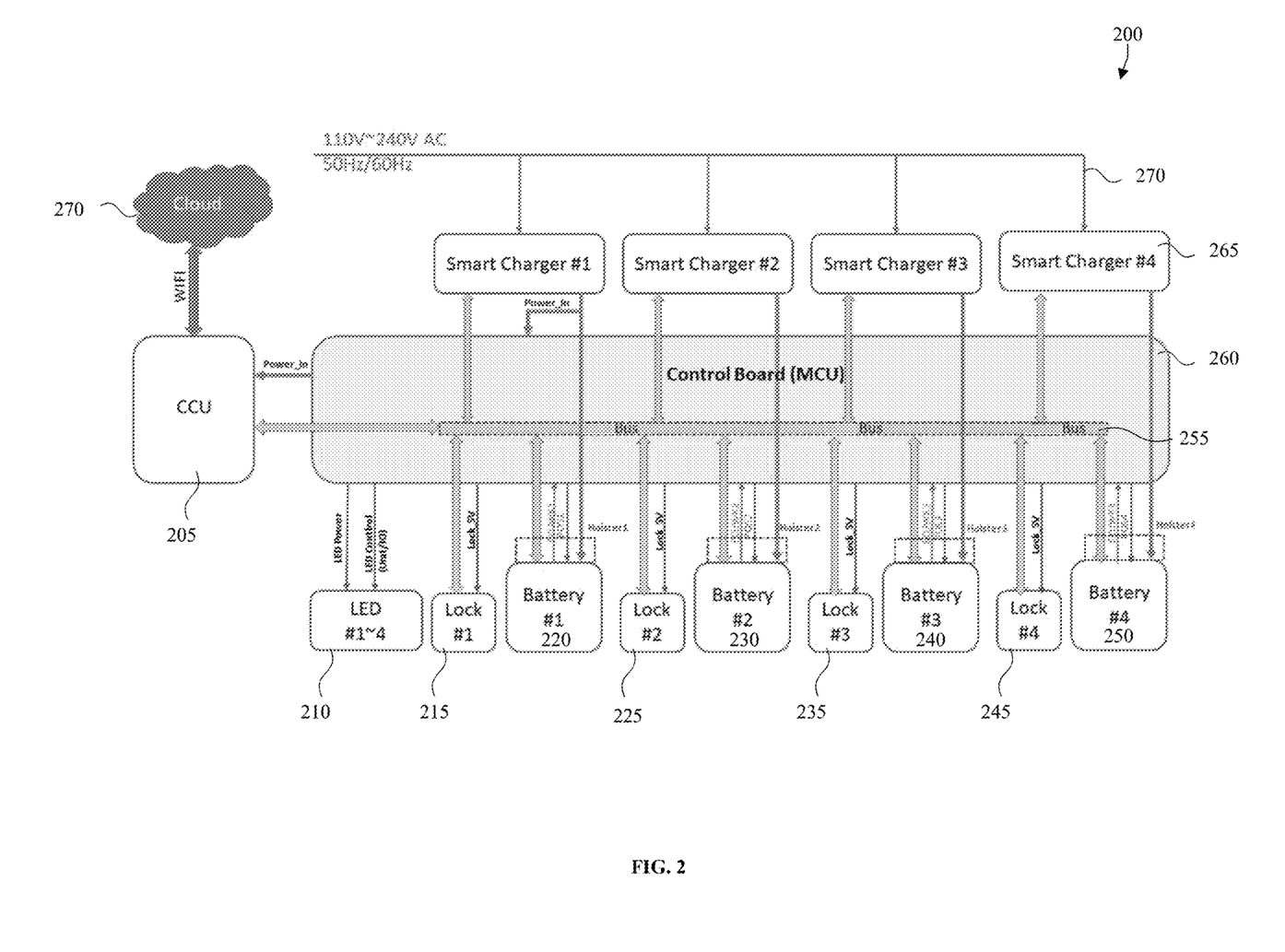
FIG. 2 illustrates a system architecture schematic for controlling a rechargeable battery cabinet.

FIG. 2 illustrates a system architecture schematic for controlling a rechargeable battery compartment 200 coupled to the cloud 270 via WiFi, though other connections, such as LTE, Ethernet, 5G or other protocols are possible. The rechargeable battery compartment 200 further includes a processor, central control unit (CCU) 205, coupled to both the cloud 270, a power line, and a communication bus 255. Communication bus 255 may be, for example, i2c, a Controller Area Network (CAN) Bus, Universal Serial Bus (USB), Peripheral Component Interconnect (PCI), PCI express (PCIe), Small Computer System Interface (SCSI), IEEE 1394 (Firewire), I2O port, or similar. Embodiments may also include using wireless communication protocols, such as Zigbee, Bluetooth, BluetoothLE, WiFi, or Z-Wave. The rechargeable battery compartment 200 may also include a series of light emitting diodes (LEDs) to indicate the state of charge for any connected rechargeable battery. The rechargeable battery compartment 200 may also include a series of locks (215, 225, 235, and 245) corresponding to rechargeable batteries (220, 230, 240, and 250), respectively. Each of the locks may have lock communication interface for receiving lock and unlock signals, for example, a high or low signal on a 5V line. Each of the rechargeable batteries (220, 230, 240, and 250) may also be coupled to the communication bus 255 to communicate with CCU 205, which is discussed further below. FIG. 2 further illustrates four smart chargers 265 coupled to respective rechargeable batteries (220, 230, 240, and 250), which, along with the series of locks (215, 225, 235, and 245), rechargeable batteries (220, 230, 240, and 250), and communication bus 255, may be integrated onto a printed circuit board (PCB) or microcontroller unit (MCU) 260. The smart chargers 265 may be coupled to AC power bar 270 to transform the AC to DC and charge rechargeable batteries (220, 230, 240, and 250). The rechargeable batteries (220, 230, 340, and 250) may supply DC power to the CCU 205 or other components in the event of AC power becomes unavailable during an outage. The rechargeable batteries (220, 230, 340, and 250) may further deliver DC power to the smart chargers 265 for conversion from DC to AC to deliver AC power for external use, such as to provide power to one or more power outlets.

Figure 3:
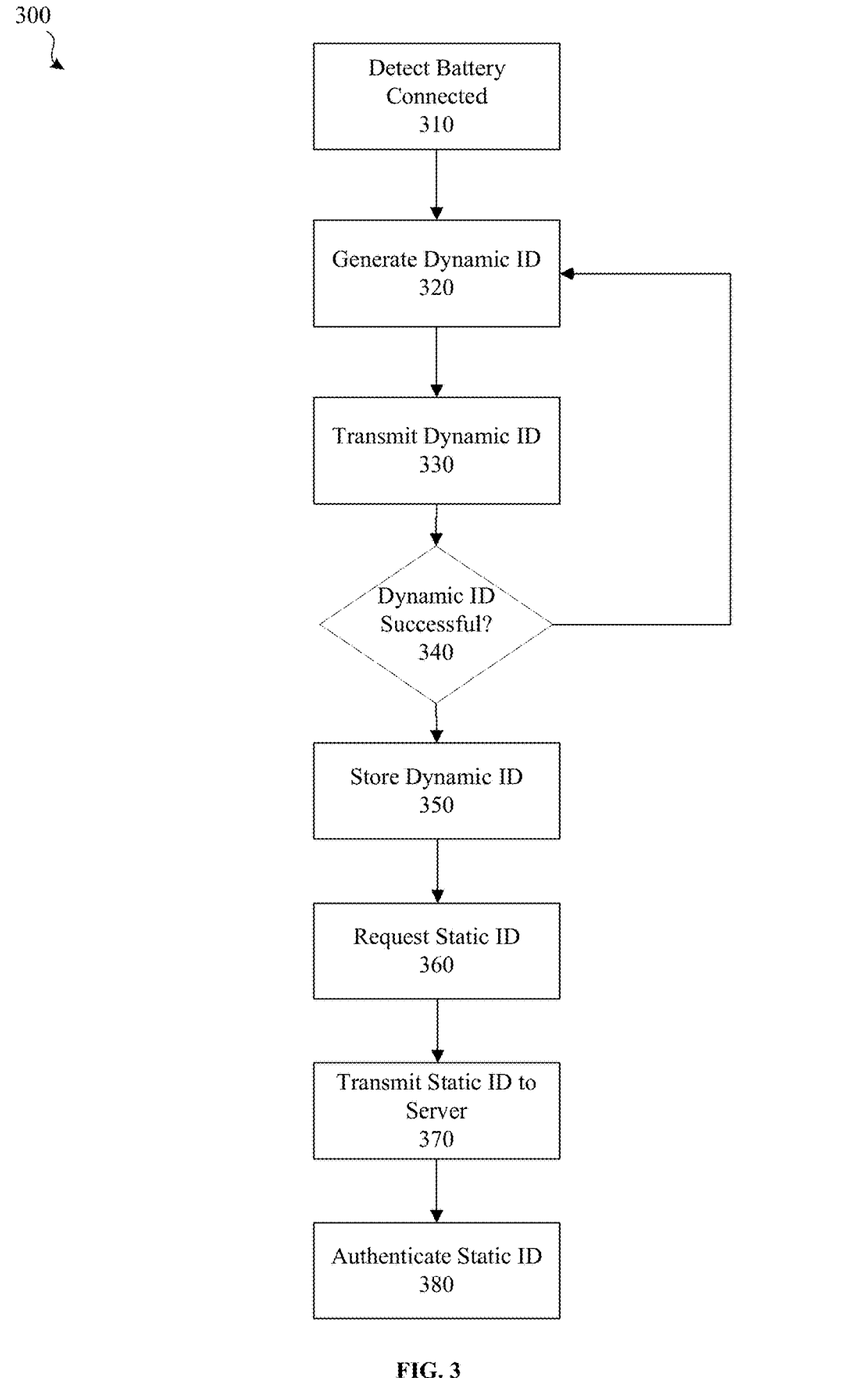
FIG. 3 illustrates an example computer-implemented method of initializing a rechargeable battery for recharging in a rechargeable battery cabinet.

FIG. 3 illustrates an example computer-implemented method 300 of initializing a rechargeable battery for recharging in a rechargeable battery cabinet. Step 310 includes detecting a rechargeable battery connected to a rechargeable battery receptacle. This may be done by, for example, including a switch in the rechargeable battery receptacle that opens or closes when a rechargeable battery is inserted or removed, or vice versa. Opening or closing the switch may generate an interrupt to the processor to request and receive a static ID, as illustrated in step 320. In step 330, the processor may contain an interrupt handler that automatically generates a dynamic ID in response to receiving the indication that a rechargeable battery is inserted into the rechargeable battery receptacle. The dynamic ID may be generated by, for example, a function of one or more inputs including a random number, date, time, and a static number. In step 340, once calculated, the processor may transmit the dynamic ID to set it the rechargeable battery or rechargeable battery receptacle. Step 350 determines whether generating or setting the dynamic ID was successful. If generating the dynamic ID is unsuccessful, the process may return to step 330 to repeat (step 340). In some embodiments, the processor may attempt to generate the dynamic ID for a predetermined number of attempts, such as 5, and generate an error if unsuccessful for that predetermined number of attempts. However, if generating the dynamic ID is successful, the process continues to step 360, in which the rechargeable battery may store the dynamic ID in a memory to execute additional communication with the processor. The processor may in turn transmit the static ID and dynamic ID to a server, such that both the local processor and/or the server are able to map the static ID to the dynamic ID. The server can log the static ID and the dynamic ID to record the location of the rechargeable battery in the system. The server may also authenticate the static ID to make sure it is a valid static ID. This may be done by, for example, using a lookup table to see whether the static ID matches a known, valid static ID. If the static ID is known and valid, then the server may complete authenticating the rechargeable battery by sending an authentication message to the processor in the rechargeable battery cabinet. After the mapping and/or the authentication steps, in step 370, the rechargeable battery cabinet may then may begin charging the rechargeable battery and communicating information, such as battery state of charge, usage history, temperature, orientation and other information to the processor and the server.

The rechargeable battery may also be able to receive or transmit additional information once authenticated. For example, the rechargeable battery may receive software or firmware updates via the communication bus. In another example, the rechargeable battery may transmit its state of charge, or current voltage, to the processor via the communication bus. The processor may then use this information to vary the voltage delivered to the charging battery to charge it more slowly, more quickly, or to stop delivery of current to stop charging the rechargeable battery.

Figure 4:
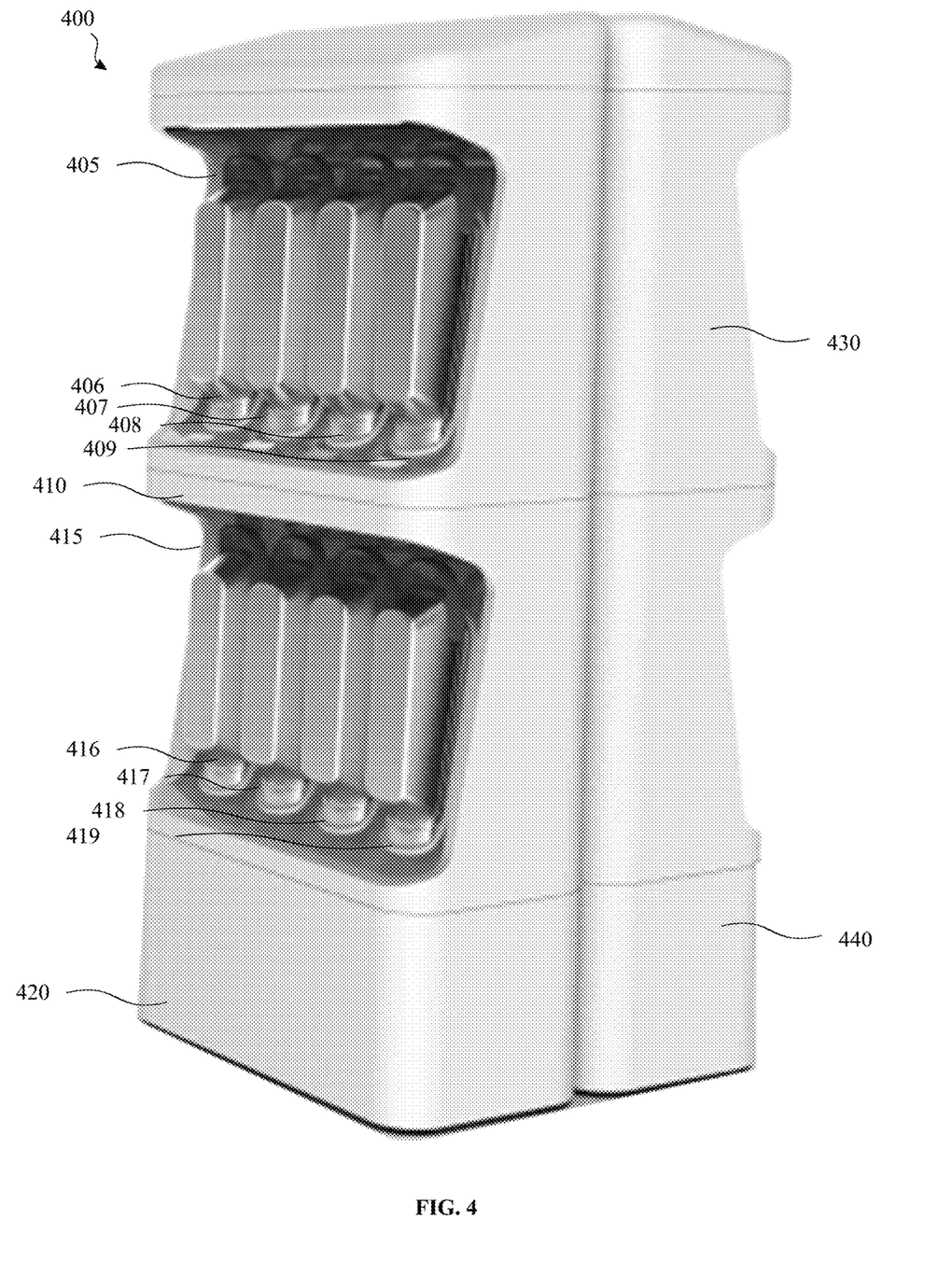
FIG. 4 illustrates a first example embodiment of a rechargeable battery cabinet.

FIG. 4 illustrates a first example embodiment of a rechargeable battery cabinet 400, having four portions (410, 420, 430, and 440). Each of the four portions has rechargeable battery compartments, but the perspective view only shows two rechargeable battery compartments 405 and 415. Rechargeable battery compartment 405 includes four rechargeable battery receptacles (406, 407, 408, and 409), and rechargeable battery compartment 415 similarly has four rechargeable battery receptacles (416, 417, 418, and 419). Each rechargeable battery receptacle in the figure has a currently engaged rechargeable battery. The rechargeable battery cabinet 400 further includes two more rechargeable battery compartments 425 and 430. These may be configured similarly to rechargeable battery compartments 405 and 415. FIG. 4 further illustrates that rechargeable battery portions 410 and 430 may be stacked on top of rechargeable battery portions 420 and 440, respectively. These two stackable groups may be placed against one another, forming a group of the four portions. The modular design may be increased or decreased by adding or subtracting portions. For example, two groups of four portions could be placed next to each other to form a group of eight portions.

Figure 5:
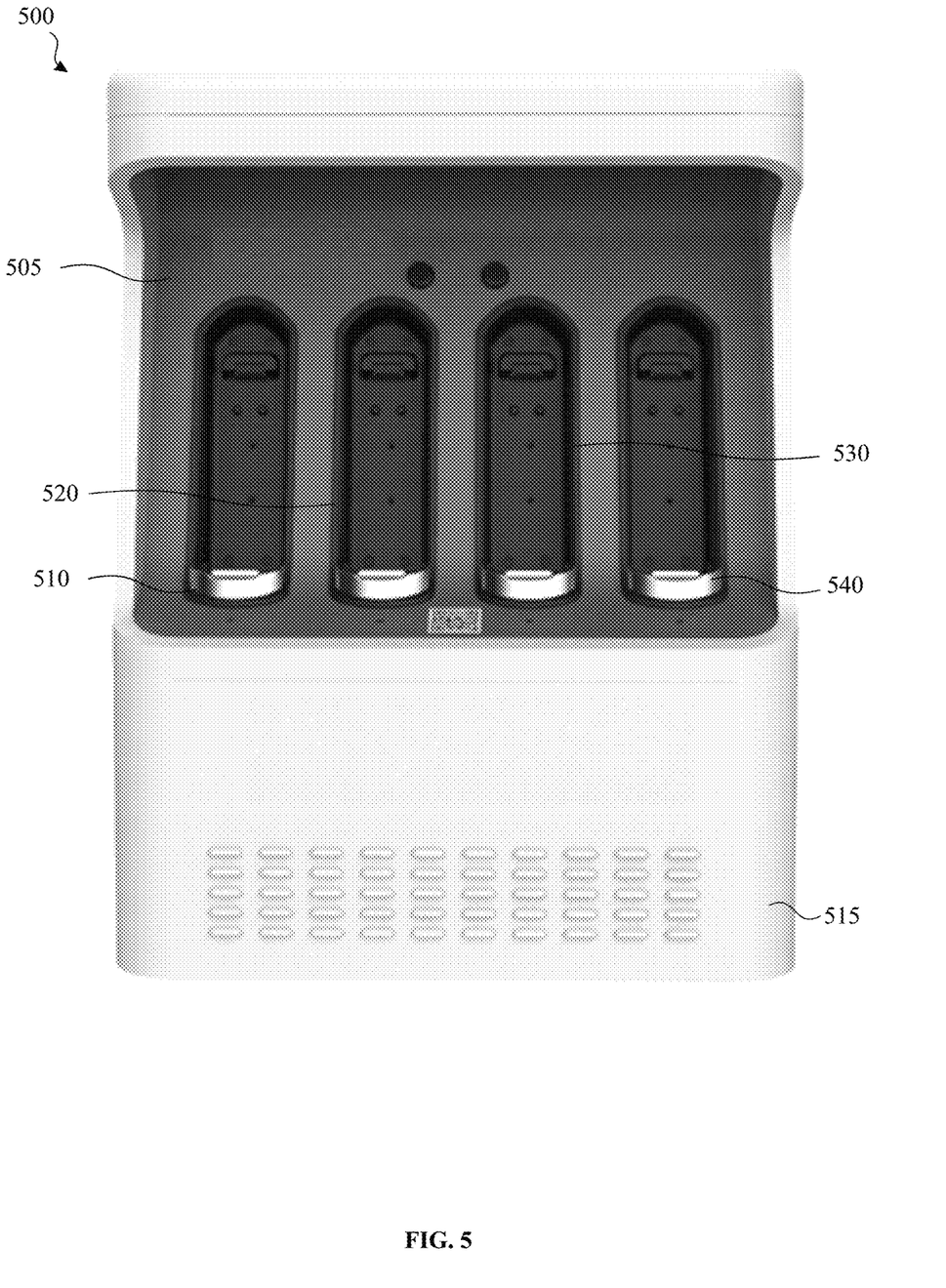
FIG. 5 illustrates a second example embodiment of a rechargeable battery cabinet.

FIG. 5 illustrates a second example embodiment of a rechargeable battery cabinet 500 having one portion 515. This embodiment includes one rechargeable battery compartment containing four rechargeable battery receptacles (510, 520, 530, and 540), which are empty, i.e., do not have any rechargeable batteries inserted in this figure. Locks are illustrated in the upper portion of the cavity of the rechargeable battery receptacles (510, 520, 530, and 540). This four-receptacle cabinet 500 may be placed in a location that has a lower demand for rechargeable battery, whereas the rechargeable battery cabinet 400 of FIG. 4 may be placed in a location with higher needs for rechargeable batteries. The process of assigning dynamic IDs allows for efficient scaling of multiple co-located rechargeable battery cabinets and other cabinets located throughout a specific region or worldwide. Assigning only static IDs would create problems such as additional overhead in tracking and avoiding conflicts, requiring a larger number space as numbers are retired and new numbers are needed. The dynamic ID system allows for reuse of IDs for different rechargeable batteries, creating a more efficient system.

Figure 6:
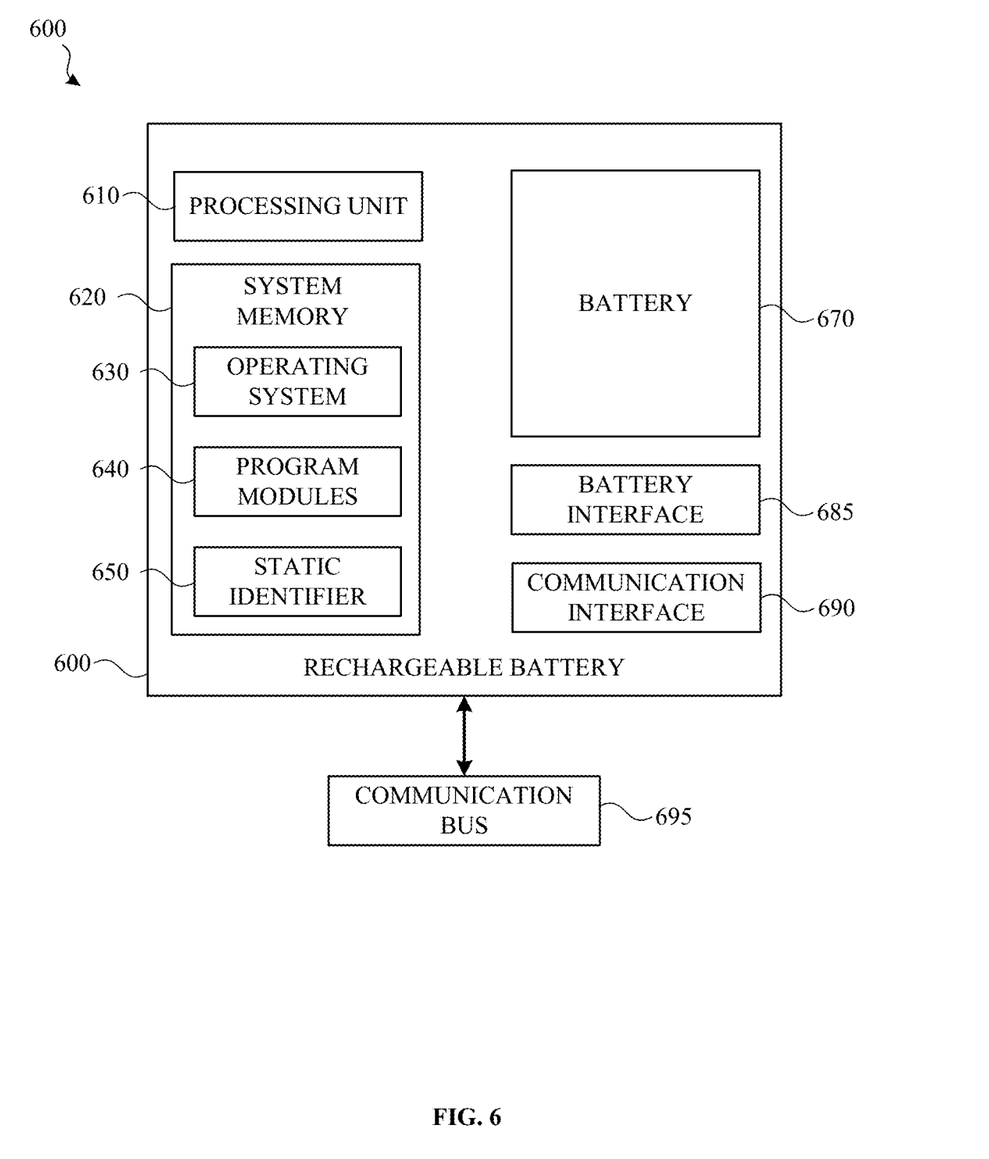
FIG. 6 illustrates an example schematic of components of a rechargeable battery.

FIG. 6 illustrates an example schematic of components of a rechargeable battery 600. The schematic includes a processing unit 610, configured to read and execute instructions stored in system memory 620. The system memory includes data and instructions, such as an operating system 630, program modules 640, and static identifier 650. The rechargeable battery 600 may include, but is not limited to, volatile storage (e.g., random access memory), non-volatile storage (e.g., read-only memory), flash memory, or any combination of such memories. The program modules 640 may be responsible for gathering or determining expected force readings, light electric vehicle information, and the like. The system memory 620 may also store and/or provide instructions for communicating with over the communication interface 690, such as a CAN bus interface, as described herein. A number of different program modules and data files may be stored in the system memory 620, including operating state information. While executing on the processing unit 610, the program modules 640 may perform the various processes described above.

The rechargeable battery 600 may also have additional features or functionality. For example, the rechargeable battery 600 may include additional data storage devices (e.g., removable and/or non-removable storage devices) such as, for example, magnetic disks, optical disks, or tape. Rechargeable battery 600 may also include a battery 670, that could be, for example, lead-acid, nickel-cadmium or lithium-ion. The rechargeable battery may be charged via battery interface 685, which may include two electrodes, positive and negative, to receive current from a DC power source. Rechargeable battery 600 may further include a communication interface 690 for communicating with communication bus 695. The rechargeable battery communication interface 690 may be, for example, the physical layer of the bus described in FIG. 2. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the rechargeable battery 600 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The rechargeable battery 600 may also include one or more sensors. The sensors may be used to detect or otherwise provide information about the operating condition of the rechargeable battery 600. In other examples, the sensors may provide information about whether the rechargeable battery is operating correctly and/or is being used correctly via Diagnostics Trouble Code DTCs (e.g., sensors sending signals to the communication bus indicating whether the rechargeable battery meets a predetermined capacity level, e.g., 250 Wh). The sensors could also include GPS, accelerometer, or pressure sensors for handle.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, is an example of computer storage media (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which may be used to store information and which may be accessed by the rechargeable battery 600. Any such computer storage media may be part of the rechargeable battery 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented may include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media may comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways.

Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein may be applied to other systems, not necessarily the system described above. The elements and acts of the various examples described above may be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A method of controlling a rechargeable battery cabinet comprising:
    receiving, at the rechargeable battery cabinet, a rechargeable battery at a rechargeable battery receptacle;
    transmitting, by a connection switch of the rechargeable battery receptacle, a connection signal to a controller, wherein the connection signal indicates that a battery is coupled with the rechargeable battery receptacle;
    in response to receiving, at a processor, the connection signal, generating a dynamic identification number corresponding to the rechargeable battery receptacle;
    transmitting, by the processor to the rechargeable battery, the dynamic identification number;
    storing, by the rechargeable battery, the dynamic identification number;
    transmitting, by the processor to the rechargeable battery, a request for a static identification number, wherein the request comprises the dynamic identification number
    reading, by the processor, the static identification number from a memory of the rechargeable battery;
    transmitting, by the rechargeable battery, the static identification number to the processor;
    transmitting, by the processor, the static identification number to a server;
    logging, by the server, the static identification number and the dynamic identification number of the rechargeable battery receptacle to which the rechargeable battery is attached;
    authenticating, by the server, the static identification number;
    transmitting, by the server to the processor, an authentication message indicating that the static identification number is authenticated; and
    in response to receiving the authentication message, enabling, by the processor, a charger to deliver power to the rechargeable battery.

2. The method of claim 1, wherein transmitting and receiving signals between the processor and the rechargeable battery comprises communication using a CAN bus.

3. The method of claim 1, wherein the rechargeable battery supplies power to the processor when the rechargeable battery cabinet loses AC power.

4. The method of claim 1, wherein the rechargeable battery cabinet comprises a plurality of rechargeable battery receptacles.

5. The method of claim 1 further comprising transmitting a lock signal, from the processor to a lock of the rechargeable battery receptacle, to lock the rechargeable battery into the rechargeable battery receptacle.

6. The method of claim 5 further comprising transmitting an unlock signal, from the processor to unlock the rechargeable battery receptacle, to lock the rechargeable battery into the rechargeable battery receptacle.

7. The method of claim 6, wherein the rechargeable battery receptacle comprises a separate lock unit, which further comprises a lock communication interface.

8. A rechargeable battery recharging system comprising:
    a plurality of rechargeable batteries, wherein each rechargeable battery comprises
        a first memory, wherein each memory comprises a dynamic identifier; and
        a battery communication interface;
    a server; and
    a battery cabinet comprising:
        a plurality of rechargeable battery receptacles, wherein each rechargeable battery receptacle comprises a communication interface;
        a processor comprising a processor communication interface;
        a communication bus coupled to the processor communication interface and each of the rechargeable battery communication interfaces;
        a second memory coupled to the processor comprising instructions to perform the steps of:
            detecting when one rechargeable battery of the plurality of rechargeable batteries is connect with one rechargeable battery receptacle of the plurality of rechargeable battery receptacles;
            generating a dynamic identification number corresponding to the one rechargeable battery receptacle;
            transmitting the dynamic identification number to the one rechargeable battery receptacle;
            transmitting a request, to the one rechargeable battery receptacle, for a static identification number, wherein the request comprises the dynamic identification number;
            receiving the static identification number from the one rechargeable battery receptacle;
            transmitting the static identification number to the server;
            receiving, from the server, an authentication message indicating that the static identification number is authenticated; and
            in response to receiving the authentication message, enabling a charger to deliver power to the one rechargeable battery.

9. The rechargeable battery recharging system of claim 8, wherein the communication bus is a CAN bus.

10. The rechargeable battery recharging system of claim 8, wherein the processor further comprises instructions to perform the step of receiving power from the one rechargeable battery when AC power is unavailable.

11. The rechargeable battery recharging system of claim 8, wherein the processor further comprises instructions to perform the step of transmitting a lock signal, to the one rechargeable battery receptacle, to lock the one rechargeable battery into the one rechargeable battery receptacle.

12. The rechargeable battery recharging system of claim 11, wherein the processor further comprises instructions to perform the step of transmitting an unlock signal, to the one rechargeable battery receptacle, to lock the one rechargeable battery into the one rechargeable battery receptacle.

13. The rechargeable battery recharging system of claim 12, wherein the one rechargeable battery receptacle comprises a separate lock unit, which further comprises a lock communication interface.

14. A rechargeable battery comprising:
a communication interface;
a memory; and
an electronic control unit comprising a processor configured to perform the steps of:
receiving, from a second processor via the communication interface, a dynamic identification number;
storing the dynamic identification number in the memory;
receiving, from the second processor via the communication interface, a request for a static identification number;
reading the static identification number from the memory;
transmitting the static identification number from the memory to the second processor via the communication interface; and
receive power from a power bus to charge the rechargeable battery.

15. The rechargeable battery of claim 14, wherein the communication interface comprises a CAN bus interface.

16. The rechargeable battery of claim 14, wherein the processor further comprises instructions to perform the step of transmitting power from the second processor when AC power is unavailable.

17. The rechargeable battery of claim 14, wherein the processor further comprises instructions to transmit state of charge information via the communication interface.

18. The rechargeable battery of claim 14, wherein the processor further comprises instructions to transmit the dynamic identification number via the communication interface.

19. The rechargeable battery of claim 14, wherein the processor further comprises instructions to receive a firmware update from the communication interface.

20. The rechargeable battery of claim 14, wherein the rechargeable battery is configured to power a light electric vehicle.

* * * * *